(No Model.)
A. C. FAIRBANKS.
BICYCLE.
No. 594,939. Patented Dec. 7, 1897.
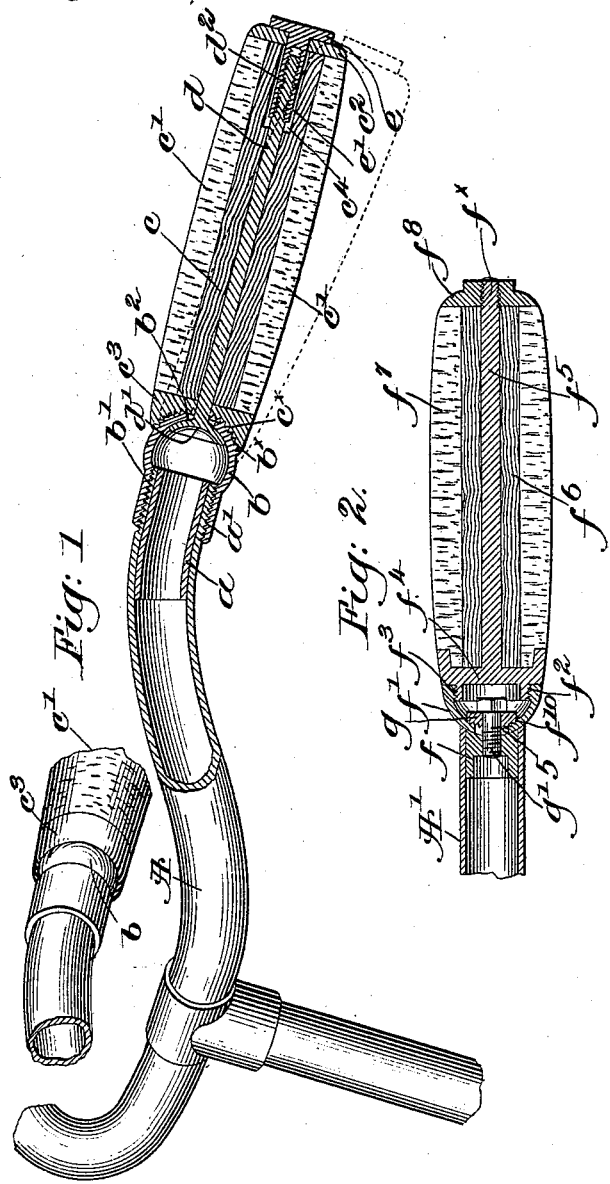
Witnesses:
A. C. Harmon
Thomas J. Drummond
Inventor:
Albert C. Fairbanks.
By Crosby & Gregory
Attys.

UNITED STATES PATENT OFFICE.

ALBERT CONANT FAIRBANKS, OF BOSTON, MASSACHUSETTS.

BICYCLE.

SPECIFICATION forming part of Letters Patent No. 594,939, dated December 7, 1897.

Application filed July 8, 1895. Serial No. 555,179. (No model.)

*To all whom it may concern:*

Be it known that I, ALBERT CONANT FAIRBANKS, of Boston, county of Suffolk, State of Massachusetts, have invented an Improvement in Bicycles, of which the following description, in connection with the accompanying drawings, is a specification, like letters and figures on the drawings representing like parts.

This invention has for its object the production of means whereby the handles may be adjusted on the handle-bar whatever the construction or shape of the latter, so that the rider can alter the position of the handles relatively to the bar according to circumstances.

By my invention the handles themselves are made adjustable on the bar in a simple manner, yet they are so connected to the bar that they will be firm and rigid when adjusted.

Figure 1 is a perspective view, partially sectioned, of a handle-bar with adjustable handles attached thereto embodying one form of my invention. Fig. 2 is a sectional view of a different form of connection.

Referring to Fig. 1, the handle-bar A, of any desired shape or construction and secured in usual manner to the post, is shown reinforced at its outer end by a bushing $a$ and threaded exteriorly at $a'$ to engage the threaded end $b'$ of a ball-ferrule $b$, having an opening $b^2$ and preferably roughened or serrated on a portion of its surface, as at $b^\times$.

The handle is shown as comprising a metal or wooden tube $c$, surrounded by cork, wood, or other suitable material $c'$, held in place by a washer $c^2$ at its outer end and by a base $c^3$, having a socket in its outer face to receive the ball-like ferrule $b$, the socket being preferably roughened or serrated, as at $c^\times$, to engage the like portion of the ball.

A spindle $d$ in Fig. 1 is extended through the ferrule $b$ and the handle, and it, as shown, has an enlarged rounded end $d'$ concentric with and adapted to engage the inner walls of the ferrule adjacent the opening $b^2$. The outer end of the spindle $d$ is threaded at $d^2$ to receive the threaded shank $e'$ of a lock-nut $e$, extended into a counterbore $c^4$ in the tubular rod $c$, the head of the lock-nut resting against the washer $c^2$. When the nut is tightened, the ball-like portion of the ferrule $b$ will be tightly drawn into the socket of the base $c^3$, the roughened contacting faces of the two preventing any relative movement of the handle and bar.

By loosening the lock-nut the handle may be adjusted to various positions, one of which is shown in dotted lines, the opening $b^2$ permitting such movement of the spindle $d$, which turns upon its enlarged end $d'$ as a center.

In Fig. 2 the handle-bar A' is reinforced at its outer end by a plug $f$, the outer end of which and the bar being concaved to receive a partially-spherical cap $f'$, threaded at $f^2$ to engage the threaded flange $f^3$ of the handle-base $f^4$. The base $f^4$ has secured to or forming a part of it a spindle $f^5$, which is passed through a metallic or wooden sleeve $f^6$, which sustains the cork or other material $f^7$, held in place by a washer $f^8$, threaded onto the spindle at $f^\times$. The cap $f'$ is slotted at 5 and interiorly roughened at $f^{10}$ to engage the roughened face of a nut or washer $g$, through which is extended a clamping-bolt $g'$, the threaded shank thereof passing through the slot 5 and into the bushing $f$.

When it is desired to adjust the handle, it is unscrewed from the cap $f'$, the clamping-bolt $g'$ loosened until the washer $g$ is disengaged from the roughened face of the cap, and the latter can then be moved in its seat in the handle-bar and bushing to proper position, after which the bolt is tightened and the handle replaced.

From the foregoing it will be obvious that the handle may be quickly and readily adjusted relatively to the handle-bar to suit the needs of the rider, and when adjusted it is held rigidly in position.

In the present instance the adjustable connection intermediate the handle and post is shown as at the end of the bar and between the latter and the handle; but it is evident that my invention is not limited to this specific position, and that the location and construction of the connection may be somewhat varied without departing from the spirit of my invention.

I claim—

1. The handle-bar, its handle, a ball-and-socket joint connecting them, the ball being hollow and provided with an elongated slot at its outer end, and means at its inner end for detachably securing it to its supporting part, and a clamp to hold them relatively immovable, the same comprising a bolt or spindle adjustably secured to the socket member, adapted to pass through the said slot and provided with a spheroidal head to engage the inner surface of the ball member, said head being inaccessible when said handle is in place, substantially as described.

2. The handle-bar, its handle, a ball-and-socket joint connecting them, the ball member being hollow, approximately a hemisphere, provided with a slot at its outer end, and removably connected at its inner end to the adjacent part, and a clamp to hold them relatively immovable, the same comprising a bolt or spindle secured to the socket member, adapted to pass through the said slot and provided with a removable head to engage the inner surface of the ball member, all the parts being arranged and combined so that the clamping means is entirely inclosed, substantially as described.

3. The handle-bar, its handle, a ball-and-socket joint connecting them, the ball member being hollow, approximately a hemisphere, provided with a slot at its outer end, screw-threaded at its inner end for the purpose of being joined to the handle, and a clamp to hold said joint members relatively immovble, the same comprising a screw-threaded bolt or spindle secured to the socket member on the handle-bar, adapted to pass through the said slot, and provided with a head convexed on its under side to engage the inner surface of the ball member whereby the clamping means is entirely inclosed, substantially as described.

4. The handle-bar, its handle, said handle being provided at its inner end with a ferrule shouldered and externally screw-threaded at its outer end, a ball-and-socket joint connecting them, the ball member being hollow, approximately a hemisphere, provided with a slot at its outer end, screw-threaded at its inner end for the purpose of being joined to the handle, and a clamp to hold said joint members relatively immovable, the same comprising a screw-threaded bolt or spindle secured to the socket member, adapted to pass through the said slot, and provided with a head convexed on its under side to engage the inner surface of the ball member, whereby the clamping means is entirely inclosed, substantially as described.

5. The handle-bar, its handle, said handle being provided at its inner end with a ferrule shouldered and externally screw-threaded at its outer end, a spindle extending from said ferrule axially through the handle, and provided at its projecting end with a nut in threaded engagement therewith, a ball-and-socket joint connecting the handle and handle-bar, the ball being hollow, approximately a hemisphere, provided with a slot at its outer end, screw-threaded at its inner end for the purpose of being joined to the handle, and a clamp to hold said joint members relatively immovable, the same comprising a screw-threaded bolt or spindle secured to the socket member, adapted to pass through the said slot, and provided with a head convexed on its under side to engage the inner surface of the ball member, whereby the clamping means is entirely inclosed, substantially as described.

In testimony whereof I have signed my name to this specification in the presence of two subscribing witnesses.

ALBERT CONANT FAIRBANKS.

Witnesses:
ALEX. C. PROUDFIT,
AUGUSTA E. DEAN.